US012794151B2

(12) United States Patent
Shibata et al.

(10) Patent No.: US 12,794,151 B2
(45) Date of Patent: Nov. 10, 2026

(54) TERMINAL BLOCK UNIT

(71) Applicant: YAZAKI CORPORATION, Tokyo (JP)

(72) Inventors: Shotarou Shibata, Shizuoka (JP); Hayato Iizuka, Shizuoka (JP); Hideto Kumakura, Shizuoka (JP); Takumi Oki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 323 days.

(21) Appl. No.: 18/675,630

(22) Filed: May 28, 2024

(65) Prior Publication Data

US 2024/0405457 A1 Dec. 5, 2024

(30) Foreign Application Priority Data

May 31, 2023 (JP) ................................ 2023-089800

(51) Int. Cl.
*H01R 13/24* (2006.01)
*H01R 9/24* (2006.01)
*H02K 5/22* (2006.01)

(52) U.S. Cl.
CPC ........... *H01R 9/24* (2013.01); *H01R 2201/26* (2013.01); *H02K 5/225* (2013.01)

(58) Field of Classification Search
CPC ........ H01R 9/24; H01R 2201/26; H01R 4/34; H01R 25/14; H01R 13/405; H02K 5/225
See application file for complete search history.

(56) References Cited

U.S. PATENT DOCUMENTS

2020/0168532 A1 5/2020 Ikeda
2024/0195090 A1 6/2024 Takada

FOREIGN PATENT DOCUMENTS

| | | | | | |
|---|---|---|---|---|---|
| JP | 2018-195697 A | | 12/2018 | | |
| JP | 2019016448 A | * | 1/2019 | .............. | H01R 9/18 |
| JP | 6532520 B1 | * | 6/2019 | | |
| JP | 2020156206 A | * | 9/2020 | | |
| JP | 2022-15642 A | | 1/2022 | | |
| JP | 2022-169252 A | | 11/2022 | | |

* cited by examiner

*Primary Examiner* — Travis S Chambers
(74) *Attorney, Agent, or Firm* — Sughrue Mion, PLLC

(57) ABSTRACT

A terminal block unit includes a plurality of terminal metal fittings, a terminal block main body configured to hold the plurality of terminal metal fittings, a bas bar unit including a plurality of bus bars each having both end portions in which a first connection hole and a second connection hole to be connected to an electric device are formed, and a plurality of bolts configured to fasten any one of the plurality of bas bars to each of the plurality of terminal metal fittings. The bas bar unit includes a resin molded portion configured to integrally support a part of each of the plurality of bus bars in a non-contact state, and another part of each of the plurality of bus bars at which the resin molded portion is not provided is an exposed portion.

7 Claims, 7 Drawing Sheets

TERMINAL BLOCK UNIT

CROSS-REFERENCE TO RELATED APPLICATION

The present application is based on, and claims priority from the Japanese Patent Application No. 2023-089800, filed on May 31, 2023, the entire contents of which are incorporated herein by reference.

TECHNICAL FIELD

The disclosure relates to a terminal block unit.

BACKGROUND

In the related art, there has been proposed a terminal block that holds a plurality of terminal metal fittings on a terminal block main body. JP 2022-15642 A discloses a technique relating to a connector that electrically connects an inverter side and a motor side and includes a housing held on a plate, which may be considered as the terminal block main body, and a plurality of first conductive members included in a terminal unit, which may be considered as the terminal metal fittings. The connector further includes a plurality of second conductive members that are connected to the first conductive members, and the plurality of second conductive members are configured as one component by using a covering member. With this, degradation of assembling operability is suppressed.

SUMMARY OF THE INVENTION

In the connector disclosed in JP 2022-15642 A, each of the plurality of second conductive members is a linear short piece member having one end connected to the first conductive member and the other end connected to an inverter-side conductive member. In other words, in JP 2022-15642 A, there is no indication of a case in which the second conductive member is regarded as a bus bar having such a shape that a circuit connected to an electric device such as an inverter is more complex. Thus, for example, when the plurality of second conductive members are regarded as a unit, easy replacement with another unit having an overall shape different from that of the unit is not guaranteed, and hence versatility is limited.

An object of the present disclosure is to provide a terminal block unit that improves versatility while suppressing degradation of assembling operability.

A terminal block unit according to an embodiment includes a plurality of terminal metal fittings, a terminal block main body configured to hold the plurality of terminal metal fittings, a bas bar unit including a plurality of bus bars each having both end portions in which connection holes to be connected to an electric device are formed, and a plurality of bolts configured to fasten any one of the plurality of bas bars to each of the plurality of terminal metal fittings, wherein the bas bar unit includes a resin molded portion configured to integrally support a part of each of the plurality of bus bars in a non-contact state, and another part of each of the plurality of bus bars at which the resin molded portion is not provided is an exposed portion.

According to the above configuration, a terminal block unit that improves versatility while suppressing degradation of assembling operability can be provided.

DETAILED DESCRIPTION OF THE INVENTION

Figure 1:
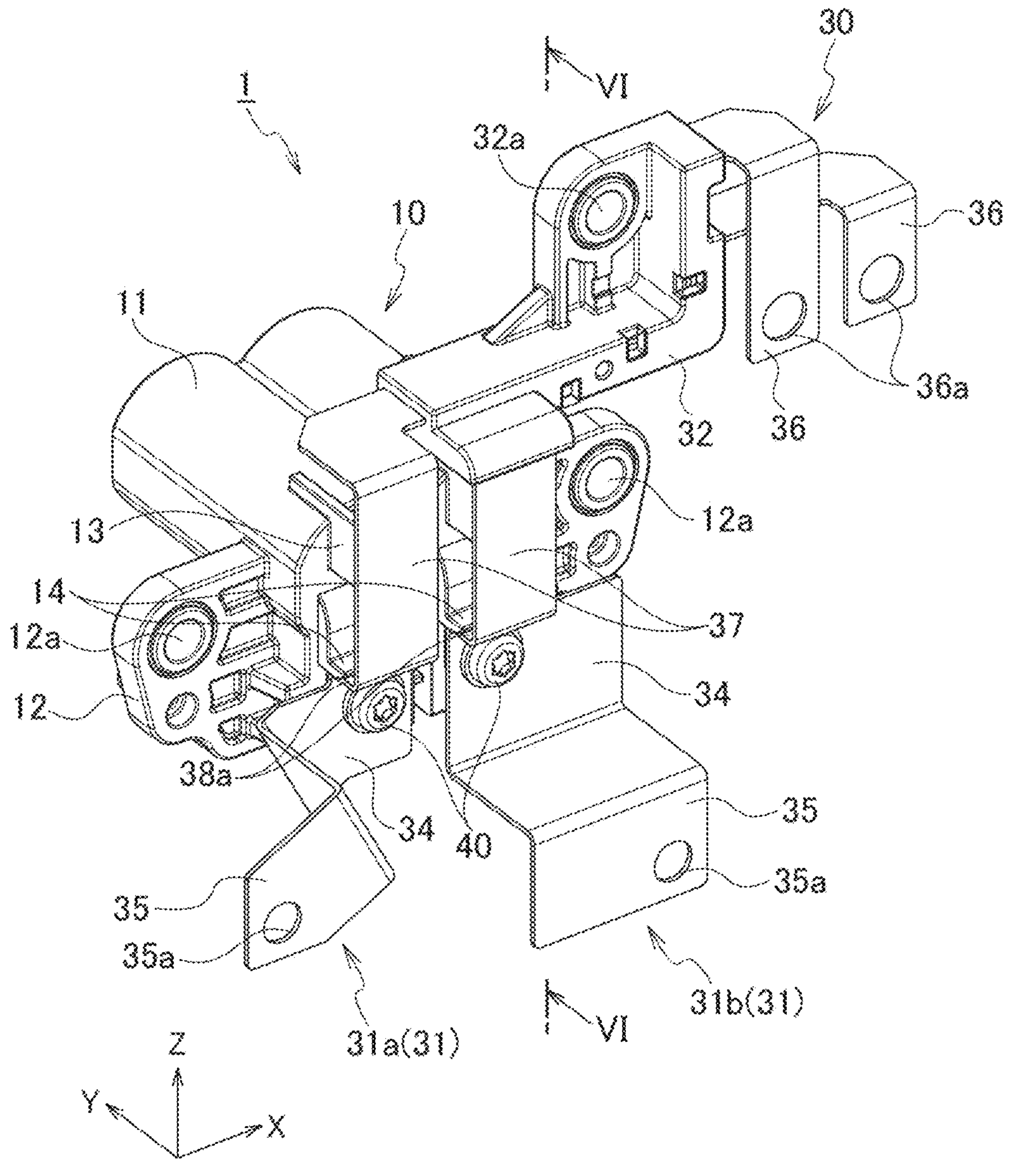
FIG. 1 is a perspective view of a terminal block unit according to a first embodiment.

A terminal block unit according to each embodiment is described below in detail with reference to the drawings. Note that the dimension ratios in the drawings are exaggerated for the convenience of the description, and may be different from the actual ratios.

First Embodiment

Figure 2:
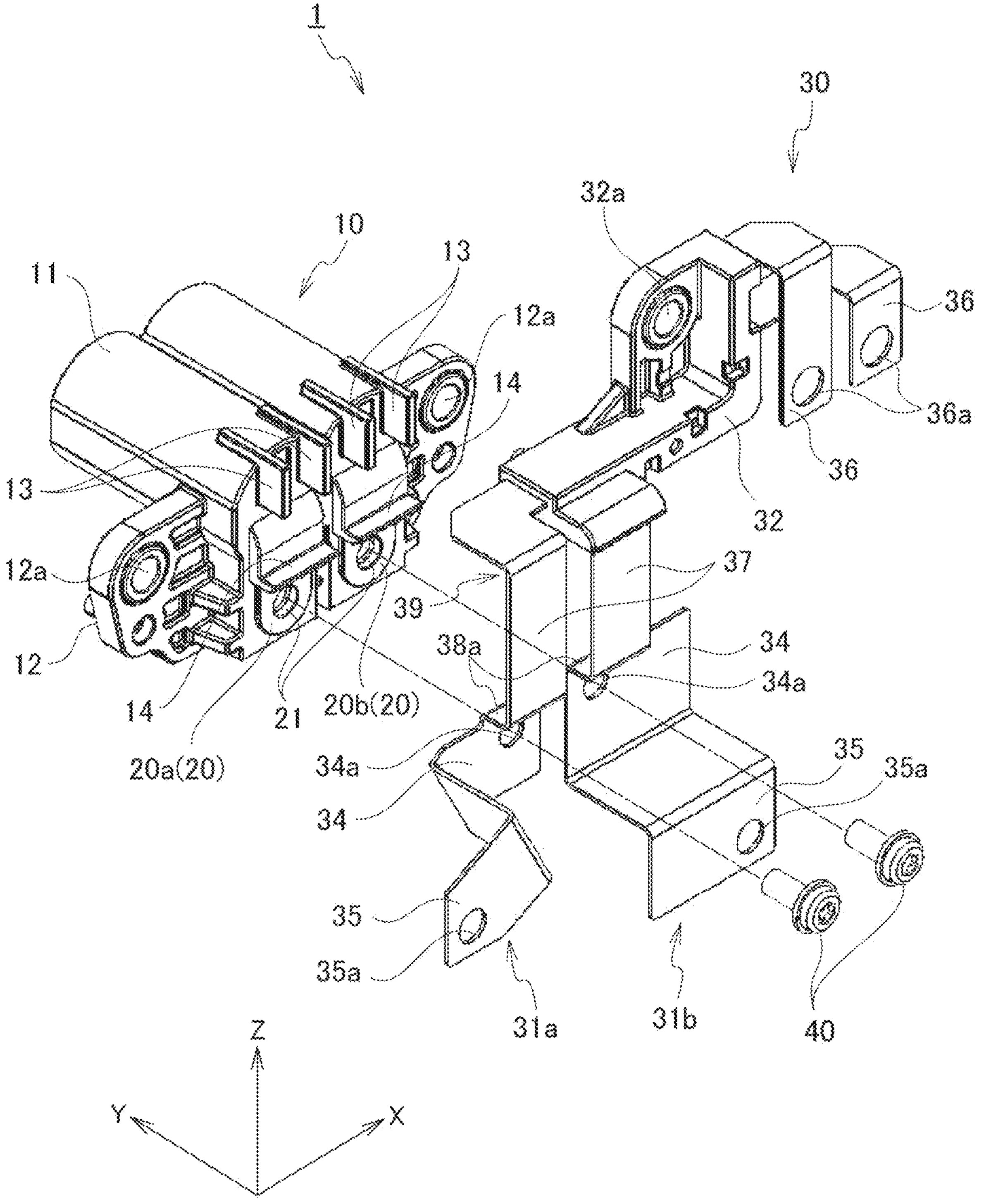
FIG. 2 is an exploded view of the terminal block unit according to the first embodiment.

FIG. 1 is a perspective view of a terminal block unit 1 according to a first embodiment. FIG. 2 is an exploded view of the terminal block unit 1.

As one example, the terminal block unit 1 relates to a motor mounted on a vehicle such as a hybrid vehicle and an electric automobile, and is installed in a conduction path that electrically connects an inverter, which is an electric device installed in the vehicle, and a high-voltage battery. In this case, specifically, the terminal block unit 1 is mounted to a motor case of the motor. The terminal block unit 1 includes a terminal block main body 10, a plurality of terminal metal fittings 20, a bus bar unit 30, and a plurality of bolts 40.

The terminal block main body 10 is formed of a synthetic resin or the like, and holds the plurality of terminal metal fittings 20. Note that a combination of the terminal block main body 10 and the plurality of terminal metal fittings 20 is simply referred to as a "terminal block" in some cases. Further, in the present embodiment, the terminal block main body 10 includes two terminal metal fittings 20. In other words, the number of poles in the terminal block is two in this case. However, the terminal block main body 10 may include three or more terminal metal fittings 20.

Hereinafter, with the terminal block main body 10 as a reference, each direction is defined as follows. The terminal block main body 10 holds the terminal metal fittings 20 so that all the terminal metal fittings 20 are in the same posture and are arranged in parallel in one direction. In this case, a direction along the direction in which the terminal metal fittings 20 are arranged in the terminal block main body 10 is defined as an X direction. In the terminal metal fitting 20 held by the terminal block main body 10, a direction along an insertion direction of an insertion hole 21 through which the bolt is inserted is defined as a Y direction orthogonal to the X direction. Hereinafter, in the Y direction, a side to which a mating connector, which is omitted in illustration, of the high-voltage battery is fitted is denoted as a "front side", and a side to which the bus bar unit 30 connected to the inverter is assembled is denoted as a "rear side" in some cases. Further, a direction orthogonal to both the X direction and the Y direction is defined as a Z direction.

Further, the terminal block main body 10 includes a housing portion 11, a plate portion 12, a first abutting portion 13, and a second abutting portion 14.

For example, the housing portion 11 is an assembly of cylindrical portions each having a cavity 11*a* (see FIG. 5 and FIG. 6) inside to which a part of the mating connector of the high-voltage battery is fitted. One cavity 11*a* is provided for one terminal metal fitting 20. Thus, in the present embodiment, the housing portion 11 has a shape in which two cylindrical portions corresponding to the two terminal metal fittings 20 are adjacent to each other in the X direction. Each of axial directions of the two cylindrical portions is along the Y direction. An opening portion 11*b* of the cavity 11*a* through which a part of the mating connector is inserted is formed on the front side of the housing portion 11.

The plate portion 12 supports the housing portion 11, and is held by the motor case, which is omitted in illustration, being a mounting target for the terminal block unit 1. The plate portion 12 has a shape having two main planes in parallel to an XZ plane, and is provided continuously to the rear side of the housing portion 11. Further, the plate portion 12 is fixed to the motor case by using a fixing bolt, which is omitted in illustration. In this case, for example, the plate portion 12 may include two first fixing holes 12*a* each passing through in the Y direction and having a cylindrical metal collar attached thereto. The two first fixing holes 12*a* are arranged to sandwich the housing portion 11 therebetween in the X direction.

Each of the first abutting portion 13 and the second abutting portion 14 is provided at a part of the outer surface of the terminal block main body 10, which faces a part of the bus bar 31 when the bus bar unit 30 is assembled to the terminal block main body 10. Of those, the first abutting portion 13 includes a first abutting surface 13*a* that faces a bent plate portion 39 being a part of the bus bar 31 at which the bus bar 31 is fastened to the terminal metal fitting 20. The second abutting portion 14 includes a second abutting surface 14*a* that is brought into contact with a flat plate portion after the bus bar 31 is fastened to the terminal metal fitting 20, flat plate portion being bent from a mounting plate portion 34 being a part of the bus bar 31. In the present embodiment, the first abutting portion 13 and the second abutting portion 14 are provided corresponding to each of the bus bars 31 that is fastened to each of the terminal metal fittings 20 by using the bolt 40. Note that specific shapes or configurations of the first abutting portion 13 and the second abutting portion 14 are described below together with a specific shape of the bus bar 31.

Figure 5:
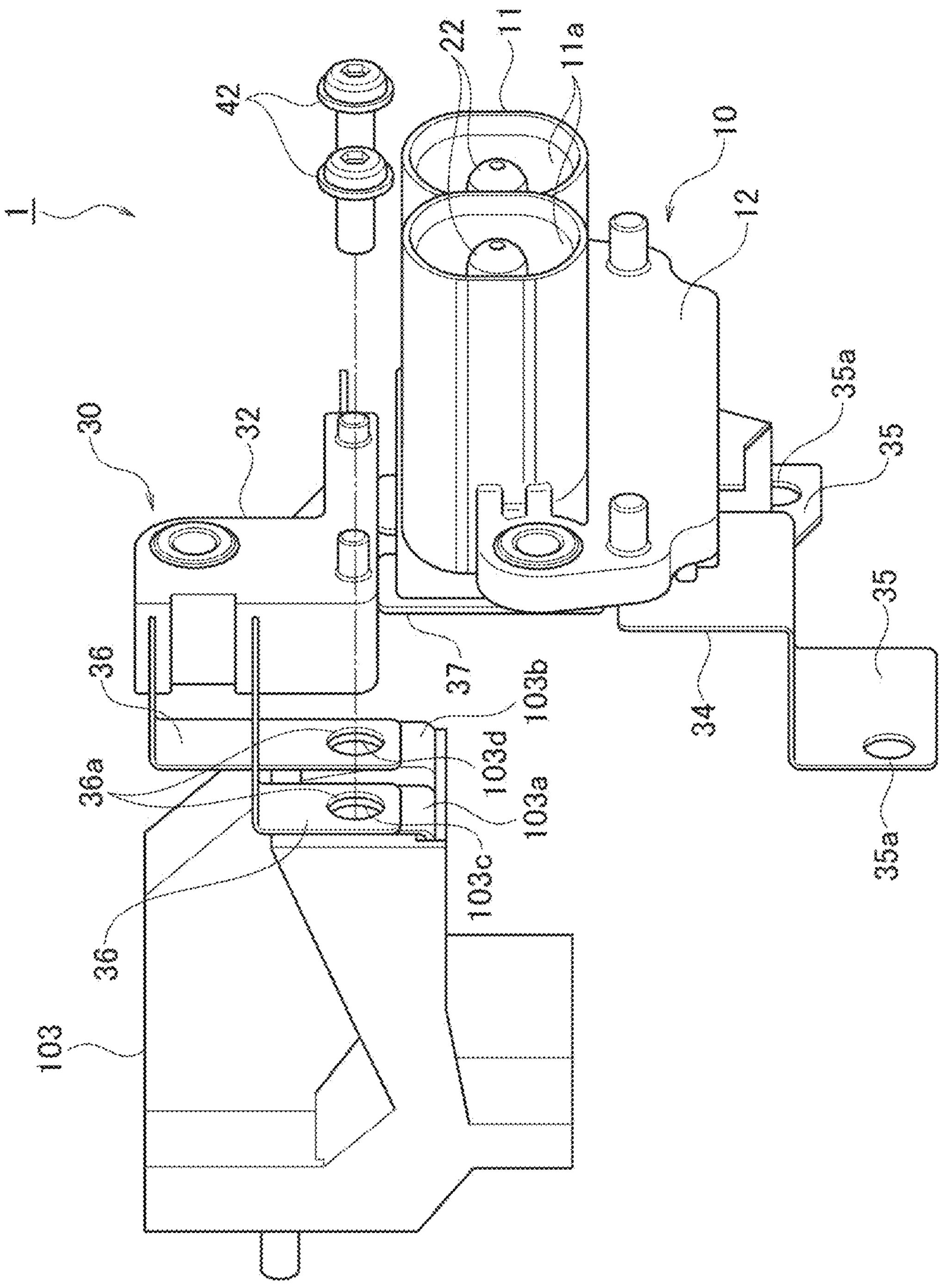
FIG. 5 is a partially exploded view illustrating connection of a second end portion of each bas bar to an electric device.
Figure 6:
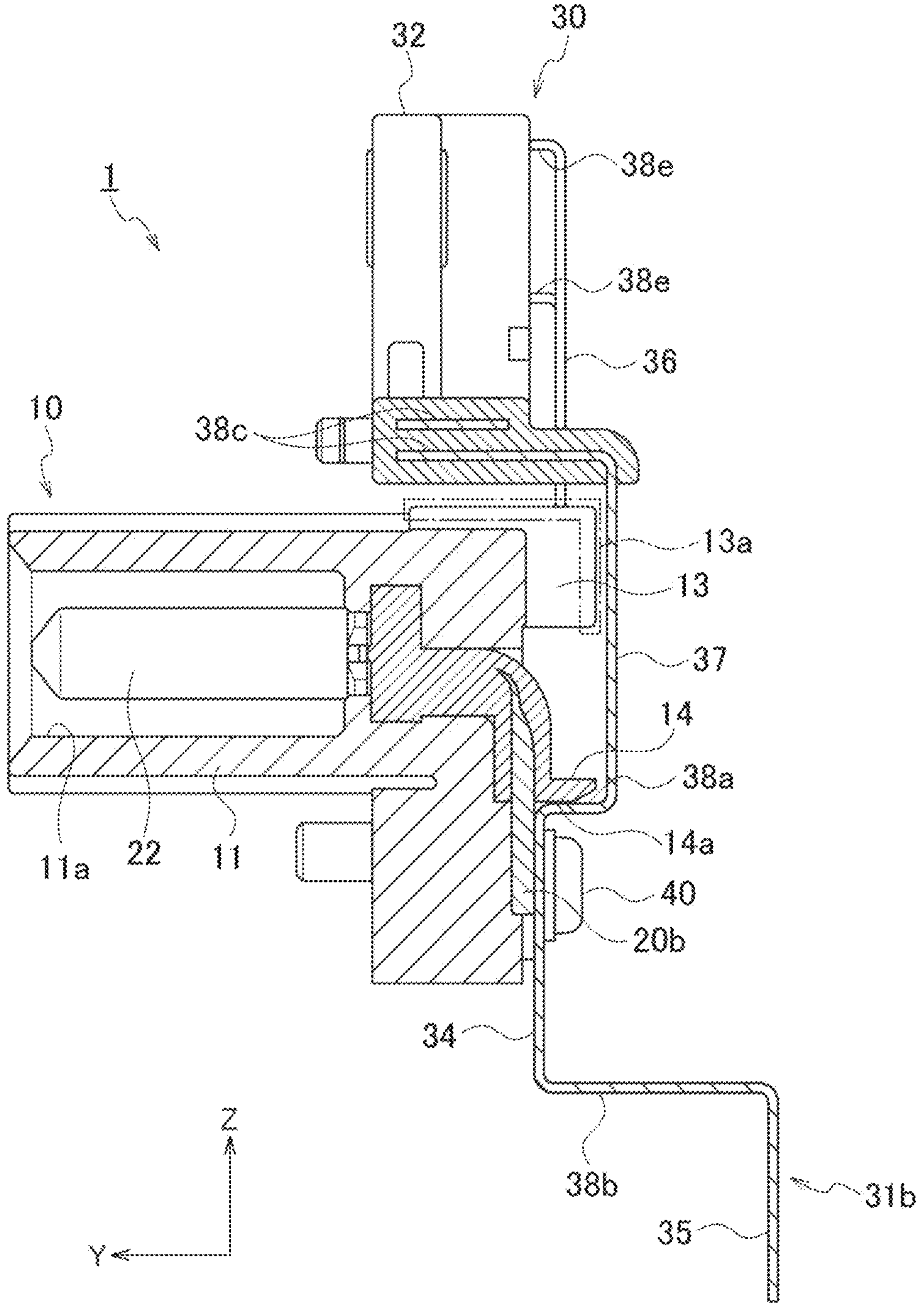
FIG. 6 is a cross-sectional view of the terminal block unit taken along the line VI-VI in FIG. 1.

The terminal metal fitting 20 is a conductive member having one end fastened to one bus bar 31 coupled to the inverter and the other end coupled to a mating terminal of the mating connector, which is a connection end portion 22 (see FIG. 5 and FIG. 6). In the present embodiment, the two terminal metal fittings 20, in other words, a first terminal metal fitting 20*a* and a second terminal metal fitting 20*b* are present. The respective terminal metal fittings 20 have the same shape.

The one end of the terminal metal fitting 20 is configured as a flat plate-like shape in parallel to the XZ plane, and includes the insertion hole 21 through which the bolt 40 is inserted. As described above, the insertion direction of the insertion hole 21 is the direction along the Y direction. Note that a screw hole through which the bolt 40 inserted through the insertion hole 21 is engage is formed in advance in the terminal block main body 10. The connection end portion 22 is a bar-like portion having an axial direction along the Y direction.

Further, the respective terminal metal fittings 20 are held so that the engagement directions of the respective bolts 40 are parallel to each other and the respective insertion holes 21 are arrayed along the insertion direction. Herein, the respective terminal metal fittings 20 may be integrally held by the terminal block main body 10 by insert molding.

Figure 3:
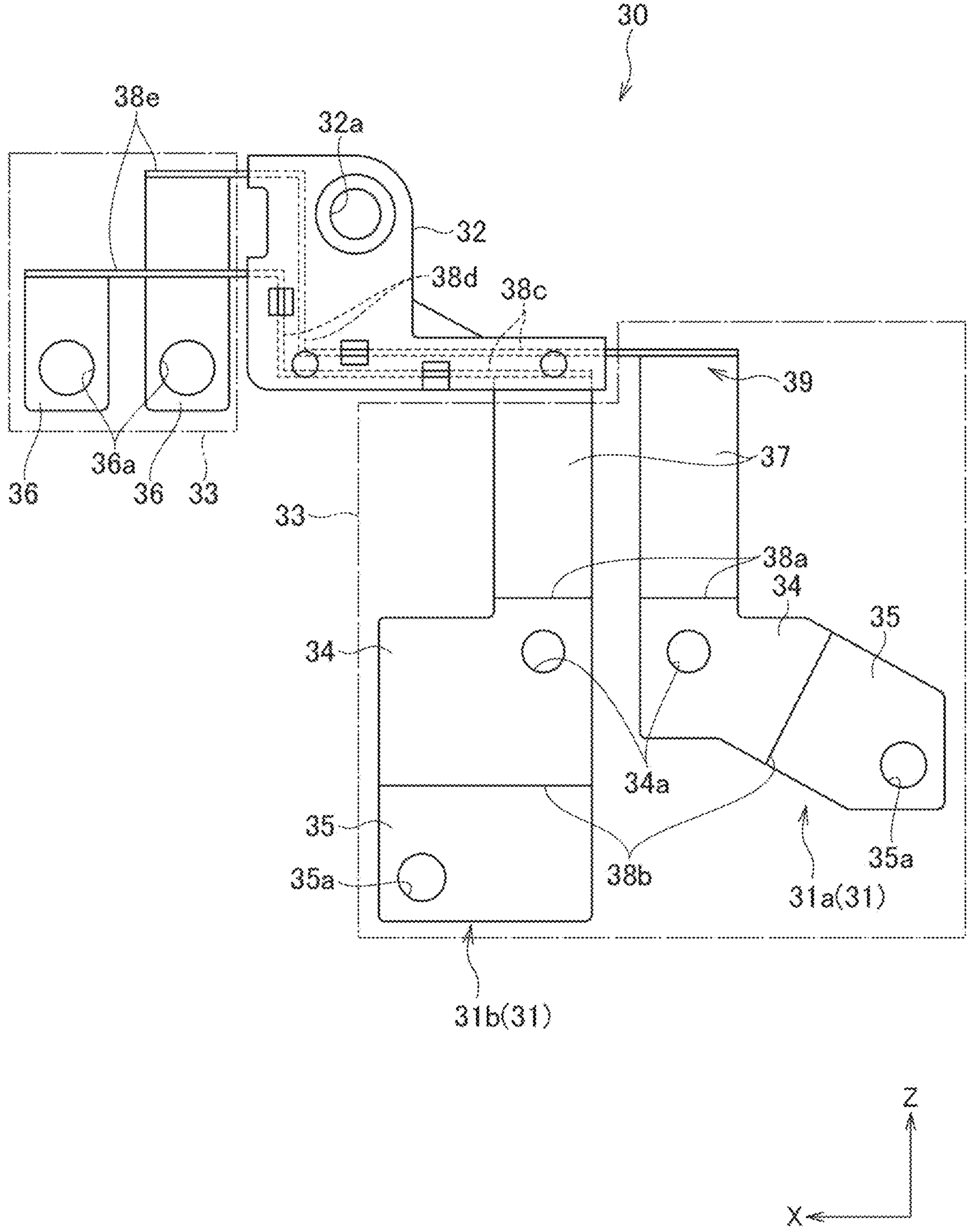
FIG. 3 is a front view of a bus bar unit.

FIG. 3 is a front view of the bus bar unit 30 as viewed in the X direction.

The bus bar unit 30 includes a plurality of bus bars 31 and a resin molded portion 32.

In the present embodiment, the bus bar unit 30 includes two bus bars 31 including a first bus bar 31*a* and a second bus bar 31*b*. The first bus bar 31*a* is a fastening target of the first terminal metal fitting 20*a*. The second bus bar 31*b* is a fastening target of the second terminal metal fitting 20*b*. The specific shapes of the first bus bar 31*a* and the second bus bar 31*b* are different from each other depending on the configuration of the inverter, but the basic shapes thereof are substantially the same. In view of this, the basic shape of the bus bar 31 is described below while giving the first bus bar 31*a* as an example.

The first bus bar 31*a* is formed of a conductive material such as metal, and is a plate body having a shape obtained by appropriately changing an extension direction from a first end portion 35 being one end to a second end portion 36 being the other end. As one example, the first bus bar 31*a* includes the mounting plate portion 34, the first end portion 35, the second end portion 36, an extension plate portion 37, and a plurality of flat plate portions for coupling those plate portions. Description is made below on the shape of the first bus bar 31*a* while assuming that, as a reference, the bus bar unit 30 is assembled to the terminal block main body 10, in other words, the first bus bar 31*a* is fastened to the first terminal metal fitting 20*a*.

The mounting plate portion 34 is a plate portion having a main plane in parallel to the XZ plane and having a through hole 34*a* formed therein. The bolt 40 passes through the through hole 34*a*.
The passing direction of the through hole 34*a* is along the Y direction.

Figure 4:
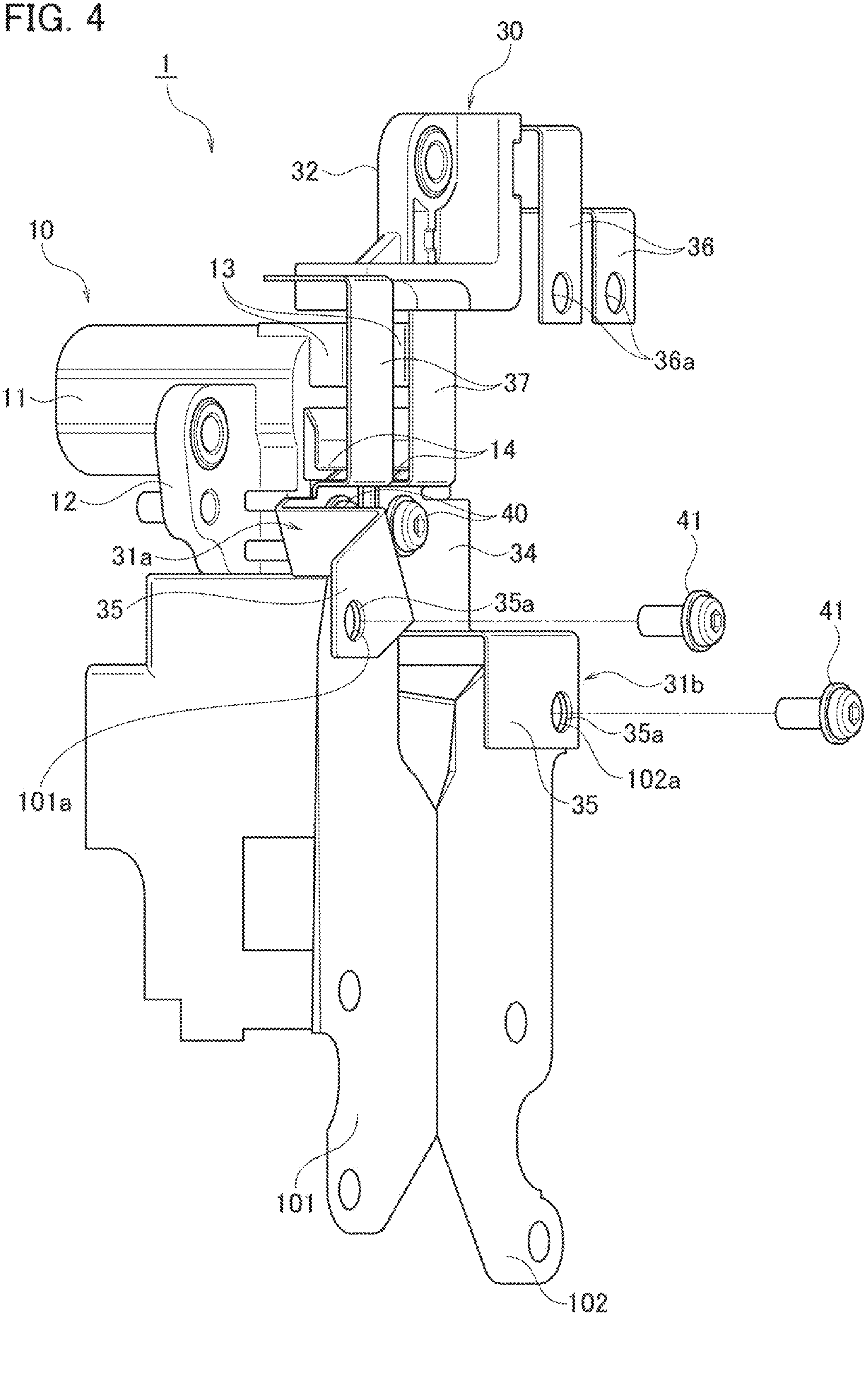
FIG. 4 is a partially exploded view illustrating connection of a first end portion of each bas bar to an electric device.

FIG. 4 is a partially exploded view illustrating connection of the first end portion 35 of the bus bar 31 to the inverter.

The first end portion 35 is a plate portion having a main plane in parallel to the XZ plane and having a first connection hole 35*a* formed therein. A first connection bolt 41 passes through the first connection hole 35*a*. The passing direction of the first connection hole 35*a* is along the Y direction. The first end portion 35 may be connected to a first component 101 being one part of the inverter. A first screw hole 101*a* is provided in advance in the first component 101. In this case, an operator engages the first connection bolt 41 with the first screw hole 101*a* while the first connection bolt 41 passes through the first connection hole 35*a*, and thus the first end portion 35 and the first component 101 can be connected to each other.

Note that, similarly to the first bus bar 31*a*, the first end portion 35 of the second bus bar 31*b* may also be connected to a second component 102 being one part of the inverter and configuring a circuit different from the first component 101. A second screw hole 102*a* is provided in advance in the second component 102. In this case, an operator engages the first connection bolt 41 with the second screw hole 102*a* while the first connection bolt 41 passes through the first connection hole 35*a*, and thus the first end portion 35 and the second component 102 can be connected to each other.

Further, the first end portion 35 of the first bus bar 31*a* is continuous with one end of the mounting plate portion 34 via a second flat plate portion 38*b* having a main plane in parallel to an XY plane.

FIG. 5 is a partially exploded view illustrating connection of the second end portion 36 of the bus bar 31 to the inverter.

The second end portion 36 is a plate portion having a main plane in parallel to the XZ plane and having a second connection hole 36*a* formed therein. A second connection bolt 42 passes through the second connection hole 36*a*. The passing direction of the second connection hole 36*a* is along the Y direction. The second end portion 36 may also be connected to first circuit 103*a* of a third component 103 being one part of the inverter and configuring a circuit different from the first component 101 and the second component 102. A third screw hole 103*c* is provided in advance in the first circuit 103*a*. In this case, an operator engages the second connection bolt 42 with the third screw hole 103*c* while the second connection bolt 42 passes through the second connection hole 36*a*, and thus the second end portion 36 and the first circuit 103*a* can be connected to each other.

Note that, similarly to the first bus bar 31*a*, the second end portion 36 of the second bus bar 31*b* may also be connected to a second circuit 103*b* being one part of the inverter and configuring a circuit different from the first component 101, the second component 102, and the first circuit 103*a*. A fourth screw hole 103*d* is provided in advance in the second circuit 103*b*. In this case, an operator engages the second connection bolt 42 with the fourth screw hole 103*d* while the second connection bolt 42 passes through the second connection hole 36*a*, and thus the second end portion 36 and the second circuit 103*b* can be connected to each other.

Herein, the first end portion 35 and the second end portion 36 are both the ends of each of the bus bars 31, and hence the mounting plate portion 34 is positioned between the first end portion 35 and the second end portion 36.

Further, the second end portion 36 of the first bus bar 31*a* is continuous with the one end of the mounting plate portion 34 via a fifth flat plate portion 38*e*, a fourth flat plate portion 38*d*, a third flat plate portion 38*c*, the extension plate portion 37, and a first flat plate portion 38*a* in the stated order. Herein, the first flat plate portion 38*a* has such a shape that the main plane is parallel to the XY plane. The third flat plate portion 38*c* has such a shape that the main plane is parallel to the XY plane. The fourth flat plate portion 38*d* has such a shape that the main plane is parallel to a YZ plane. The fifth flat plate portion 38*e* has such a shape that the main plane is parallel to the XY plane.

The extension plate portion 37 is a plate portion having a main plane in parallel to the XZ plane and extending in the Z direction. In the bus bar unit 30, the extension plate portion 37 of the first bus bar 31*a* and the extension plate portion 37 of the second bus bar 31*b* are arranged so that at least parts thereof are arrayed along the X direction.

The resin molded portion 32 integrally holds a part of the first bus bar 31*a* and a part of the second bus bar 31*b* in a non-contact state. In the present embodiment, in each of the bus bars, the third flat plate portion 38*c* is continuous with one end of the fourth flat plate portion 38*d*, and the fifth flat plate portion 38*e* is continuous with the other end of the fourth flat plate portion 38*d*. In this state, as illustrated in FIG. 3, the third flat plate portion 38*c* is continuous with the fourth flat plate portion 38*d* in a state in which the third flat plate portion 38*c* is bent at a right angle in a direction opposite to the X direction, and the fifth flat plate portion 38*e* is continuous with the fourth flat plate portion 38*d* in a state in which the fifth flat plate portion 38*e* is bent at a right angle in the X direction. In view of this, in the present embodiment, the resin molded portion 32 may be formed to include the entire fourth flat plate portion 38*d*, at least a part of the third flat plate portion 38*c*, and at least a part of the fifth flat plate portion 38*e*. In this case, the resin molded portion 32 is molded in a state in which the resin molded portion 32 includes the plurality of bent portions of the respective bus bars 31. Thus, for example, the resin molded portion 32 after molding can be prevented from causing positional deviation on the bus bar 31.

Further, for example, the resin molded portion 32 may include a second fixing hole 32*a* passing through the Y direction and having a cylindrical metal collar attached thereto so that the bus bar unit 30 can be fixed to a part of the motor case by using a fixing bolt as required.

As illustrate in FIG. 3, a part of the bus bar 31 in which the resin molded portion 32 is not provided is collectively referred to as an exposed portion 33. In the present embodiment, at least a part of the mounting plate portion 34, the first end portion 35, the second end portion 36, and the extension plate portion 37 is the exposed portion 33.

The bolt 40 fastens any one of the plurality of bus bars 31 to each of the terminal metal fittings 20 when the terminal block main body 10 is assembled to the bus bar unit 30. An operator engages the bolt 40 with the screw hole of the terminal block main body 10 while the bolt 40 passes through the through hole 34*a* formed in the mounting plate portion 34 and the insertion hole 21 formed in the terminal metal fitting 20. With this, the bus bar 31 can be fastened to the terminal metal fitting 20.

FIG. 6 is a cross-sectional view of the terminal block unit 1 taken along the line VI-VI in FIG. 1. FIG. 6 is a cross-sectional view taken along the YZ plane that includes the second bus bar 31*b* but does not include the engagement position of the bolt 40.

Herein, in the bus bar unit 30, a part of the first bus bar 31*a* at which the extension plate portion 37 and the third flat plate portion 38*c* are continuous with each other is the bent plate portion 39 (see FIG. 2 and FIG. 3). In the bent plate portion 39, the third flat plate portion 38*c* extends in the Y direction from the extension plate portion 37. Thus, in a state in which the bus bar unit 30 is assembled to the terminal block main body 10, as illustrated in FIG. 6, a part of the third flat plate portion 38*c* faces a part of the terminal block main body 10 in the Z direction. In view of this, in the present embodiment, the first abutting portion 13 is provided to the terminal block main body 10 so that a part of the first abutting portion 13 faces a part of the extension plate portion 37 and the other part of the first abutting portion 13 faces a part of the third flat plate portion 38*c*. In this state, the surface facing the extension plate portion 37 or the third flat plate portion 38*c* is the first abutting surface 13*a*, which is indicated as the range surrounded by the two-dot chain line in FIG. 6.

Further, in each of the bus bars 31 of the bus bar unit 30, the first flat plate portion 38*a* is bent in a direction opposite to the Y direction from the one end of the mounting plate portion 34. In view of this, in the present embodiment, the second abutting portion 14 is a protrusion shape that protrudes in the direction opposite to the Y direction, and is brought into contact with the surface of the first flat plate portion 38*a* after the bus bar 31 is fastened to the terminal metal fitting 20, as illustrated in FIG. 6. In this state, the surface that is brought into contact with the first flat plate portion 38*a* is the second abutting surface 14*a*.

Next, effects of the terminal block unit 1 are described.

The terminal block unit 1 includes the plurality of terminal metal fittings 20, and the terminal block main body 10 that holds the plurality of terminal metal fittings 20. Further, the terminal block unit 1 includes the bus bar unit 30 including the plurality of bus bars 31 each having both the ends in which the connection holes to be connected to the electric device are formed, and the plurality of bolts 40 that fasten any one of the plurality of bus bars 31 to each of the terminal metal fittings 20. The bus bar unit 30 includes the resin molded portion 32 that integrally supports a part of the respective bus bars 31 in a non-contact state, and the other part of the bus bar 31 at which the resin molded portion 32 is not provided is the exposed portion 33.

Herein, in the example described above, the plurality of terminal metal fittings 20 correspond to the first terminal metal fitting 20*a* and the second terminal metal fitting 20*b*. In the example described above, the plurality of bus bars 31 correspond to the first bus bar 31*a* and the second bus bar 31*b*. In the example described above, both the ends of each of the bus bars 31 correspond to the first end portion 35 in which the first connection hole 35*a* is formed and the second end portion 36 in which the second connection hole 36*a* is formed. Further, the electric device to be connected to the connection hole is an inverter, for example.

First, in the terminal block unit 1, the respective bus bars 31 are bolt-fastened to the respective terminal metal fitting 20, and hence an operator can easily mount the respective bus bars 31 to the respective terminal metal fittings 20. In other words, an operator can easily assemble the bus bar unit 30 to the terminal block main body 10. Further, in the bus bar unit 30, the plurality of bus bars 31 are integrally supported by the resin molded portion 32, and hence handling of the plurality of bus bars 31 is facilitated. As a result, the number of steps required for assembling to the terminal block main body 10 can be reduced. Therefore, according to the terminal block unit 1, it is advantageous in assembling operability.

Further, the respective bus bars 31 are bolt-fastened to the terminal metal fitting 20. Thus, an operator can easily remove the bus bar unit 30 from the terminal block main body 10 by releasing bolt fastening. Herein, it is assumed that the shape of the terminal block main body 10 is constant. Meanwhile, it is assumed that a plurality of bus bar units 30 are prepared in advance, each with a different overall shape relating to routing of the bus bars 31 while maintaining a common shape for the fastening portions to the plurality of terminal metal fittings 20. In this case, an operator can easily perform replacement with a desired bus bar unit 30 for the terminal block main body 10, and hence the configuration of the terminal block unit 1 can be changed as appropriate according to various vehicle types or individual specifications. In particular, in the terminal block unit 1, the connection holes to be connected to the electric device are provided in both the end portions of each of the bus bars 31, and hence the part to be fastened to the terminal metal fitting 20 by using the bolt 40 is at the part different from both the end portions in which the connection holes are provided. Therefore, the terminal block unit 1 can accommodate each of the bus bars 31 even when each of the bus bars 31 has a complex shape to match with a requirement of an electric device. Further, the part of the bus bar unit 30 at which the resin molded portion 32 is not provided is the exposed portion 33, and hence each of the bus bars 31 retains a shape that allows flexibility. Thus, each of the bus bars 31 can absorb a dimensional tolerance of the part to be fastened to the terminal metal fitting 20, and hence mountability can be improved. As a result, a wider range of shapes of the bus bar 31 that can be accommodated can be achieved. Therefore, according to the terminal block unit 1, versatility can be improved.

As described above, according to the present embodiment, the terminal block unit 1 that improves versatility while suppressing degradation of assembling operability can be provided.

Further, in the terminal block unit 1, the terminal metal fitting 20 may include the insertion hole 21 through which the bolt 40 can be inserted. The bus bar 31 may include the mounting plate portion 34 in which the through hole 34*a* through which the bolt 40 is inserted is formed. The terminal block main body 10 may hold the respective terminal metal fittings 20 so that the engagement directions of the respective bolts 40 are parallel to each other and the respective insertion holes 21 are arrayed in the direction orthogonal to the insertion direction.

Herein, in the example describe above, the insertion direction of the bolt 40 corresponds to the Y direction. Further, in the example describe above, the direction orthogonal to the insertion direction of the bolt 40, which is the direction in which the respective insertion holes 21 are arrayed, corresponds to the X direction.

According to the terminal block unit 1, fastening with the bolt 40 for each of the plurality of bus bars 31 is required, but the engagement directions of the respective bolts 40, in other words, the fastening directions of the respective bus bars 31 are uniform. Thus, assembling operability can be improved.

Further, in the terminal block unit 1, at least one of the plurality of bus bars 31 may include the bent plate portion 39 at the exposed portion 33. The terminal block main body 10 may include the first abutting surface 13*a* facing the bent plate portion 39 at the position at which the bus bar 31 including the bent plate portion 39 is fasted to the terminal metal fitting 20.

According to the terminal block unit 1, at the time of assembling of the bus bar unit 30, an operator brings the bus bar unit 30 close to the terminal block main body 10 so that the bent plate portion 39 abuts against the first abutting surface 13*a*, and thus the bus bar unit 30 can be positioned easily. Therefore, assembling operability can be improved.

Further, in the terminal block unit 1, the respective bus bars 31 may include a flat plate portion at the exposed portion 33, the flat plate portion being bent from the mounting plate portion 34. The terminal block main body 10 may include a plurality of second abutting surfaces each being brought into contact with the flat plate portion after the bus bar 31 is fastened to the terminal metal fitting 20.

Herein, in the example describe above, the flat plate portion that is brought into contact with the second abutting surface 14*a* and is bent from the mounting plate portion 34 corresponds to the first flat plate portion 38*a*.

According to the terminal block unit 1, the first flat plate portion 38*a* can be continuously brought into contact with the second abutting surface 14*a* for each of the bus bars 31 after the bus bar unit 30 is assembled to the terminal block main body 10, and hence excessive deformation of the bus bar 31 can be suppressed. Therefore, this is advantageous in securing quality of the terminal block unit 1.

Second Embodiment

Figure 7:
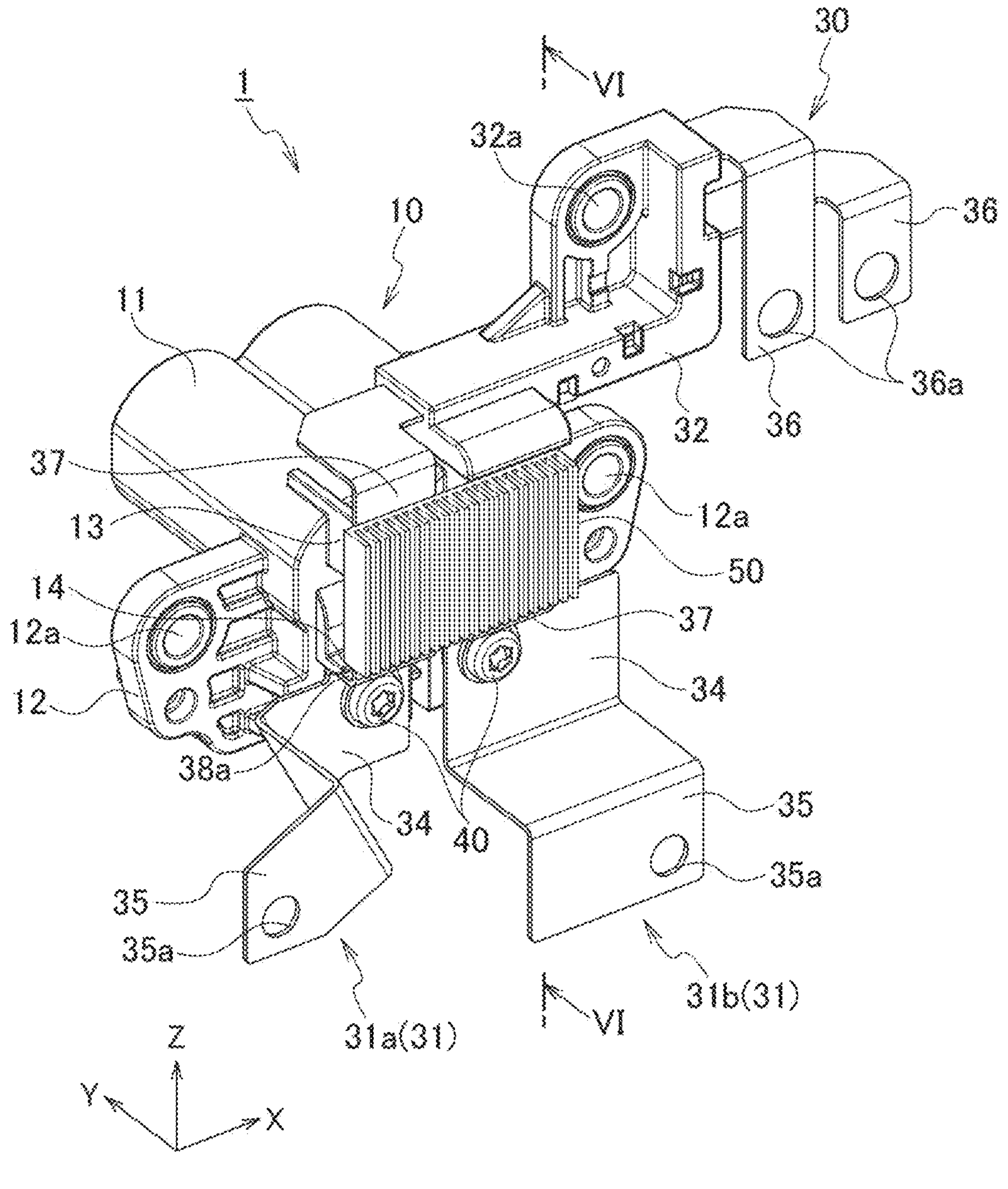
FIG. 7 is a perspective view of a terminal block unit according to a second embodiment.

FIG. 7 is a perspective view of the terminal block unit 1 according to a second embodiment.

In the terminal block unit 1 according to the first embodiment described above, in the bus bar unit 30, the exposed portion 33 is present in each of the bus bars 31, and hence heat dispersion from the bus bar 31 is promoted. As a result, this may be advantageous in increasing an energizing current value.

Herein, in the bus bar unit 30, the first bus bar 31*a* and the second bus bar 31*b* each include the extension plate portion 37 as a part of the exposed portion 33. The extension plate portions 37 are arrayed in the same posture while the main planes thereof are oriented in the same direction. In view of this, as illustrated in FIG. 7, in the bus bar unit 30 in the present embodiment, a heat sink 50 is mounted over the two extension plate portions 37. Note that the heat sink 50 may be freely mounted to or removed from each of the bus bars 31.

In other words, the bus bar unit 30 may include the heat sink 50 mounted over the exposed portion 33 of each of the plurality of bus bars 31.

According to the present embodiment, the heat sink 50 is mounted to the exposed portion 33, and hence heat dispersion can be improved more. As a result, an energizing current value can be increased more.

Note that the case in which the first bus bar 31*a* and the second bus bar 31*b* as the plurality of bus bars 31 have substantially the same basic shape is described above. In contrast, the bus bar unit 30 may include three or more bus bars as the plurality of bus bars 31, and the basic shapes as well as the specific shapes of the respective bus bars 31 may be different from each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A terminal block unit, comprising:
a plurality of terminal metal fittings;
a terminal block main body configured to hold the plurality of terminal metal fittings;
a bus bar unit including a plurality of bus bars each having both end portions and connection holes to be connected to an electric device; and
a plurality of bolts configured to fasten any one of the plurality of bus bars to each of the plurality of terminal metal fittings, wherein
the bus bar unit includes a resin molded portion configured to integrally support a part of each of the plurality of bus bars in a non-contact state, and another part of each of the plurality of bus bars at which the resin molded portion is not provided is an exposed portion,
each of the plurality of bus bars includes, at the exposed portion, a mounting plate portion in which a through hole through which each of the plurality of bolts passes is formed, and
the mounting plate portion of at least one of the plurality of bus bars is positioned on a first plane, and each of the both end portions is positioned on a plane offset from the first plane.

2. The terminal block unit according to claim 1, wherein
each of the plurality of terminal metal fittings includes an insertion hole through which each of the plurality of bolts is inserted, and
the terminal block main body holds the plurality of terminal metal fittings so that insertion directions of the plurality of bolts are parallel to each other and the insertion holes are arrayed along a direction orthogonal to the insertion directions.

3. The terminal block unit according to claim 1, wherein
at least one of the plurality of bus bars includes a bent plate portion at the exposed portion, and
the terminal block main body includes a first abutting surface facing the bent plate portion at a position at which the at least one of the plurality of bus bars including the bent plate portion is fastened to the terminal metal fitting.

4. The terminal block unit according to claim 2, wherein
each of the plurality of bus bars includes a flat plate portion at the exposed portion, the flat plate portion being bent from the mounting plate portion, and
the terminal block main body includes a plurality of second abutting surfaces each being brought into contact with the flat plate portion after the plurality of bus bars are fastened to the plurality of terminal metal fittings.

5. The terminal block unit according to claim 1, wherein
the bus bar unit includes a heat sink mounted over the exposed portion of each of the plurality of bus bars.

6. A terminal block unit, comprising:
a plurality of terminal metal fittings;
a terminal block main body configured to hold the plurality of terminal metal fittings;
a bus bar unit including a plurality of bus bars each having both end portions in which connection holes to be connected to an electric device are formed; and
a plurality of bolts configured to fasten any one of the plurality of bus bars to each of the plurality of terminal metal fittings, wherein
the bus bar unit includes a resin molded portion configured to integrally support a part of each of the plurality of bus bars in a non-contact state, and another part of each of the plurality of bus bars at which the resin molded portion is not provided is an exposed portion,
each of the plurality of terminal metal fittings includes an insertion hole through which each of the plurality of bolts is inserted,
each of the plurality of bus bars includes, at the exposed portion, a mounting plate portion in which a through hole through which each of the plurality of bolts passes is formed,
the terminal block main body holds the plurality of terminal metal fittings so that insertion directions of the plurality of bolts are parallel to each other and the insertion holes are arrayed along a direction orthogonal to the insertion directions,
each of the plurality of bus bars includes a flat plate portion at the exposed portion, the flat plate portion being bent from the mounting plate portion, and
the terminal block main body includes a plurality of second abutting surfaces each being brought into contact with the flat plate portion after the plurality of bus bars are fastened to the plurality of terminal metal fittings.

7. A terminal block unit, comprising:
a plurality of terminal metal fittings;
a terminal block main body configured to hold the plurality of terminal metal fittings;
a bus bar unit including a plurality of bus bars each having both end portions in which connection holes to be connected to an electric device are formed; and a plurality of bolts configured to fasten any one of the plurality of bus bars to each of the plurality of terminal metal fittings, wherein the bus bar unit includes a resin molded portion configured to integrally support a part of each of the plurality of bus bars in a non-contact state, and another part of each of the plurality of bus bars at which the resin molded portion is not provided is an exposed portion, and the bus bar unit includes a heat sink mounted over the exposed portion of each of the plurality of bus bars.

* * * * *